United States Patent [19]
Chan et al.

[11] Patent Number: 5,828,895
[45] Date of Patent: Oct. 27, 1998

[54] METHODS AND SYSTEM FOR PREDECODING INSTRUCTIONS IN A SUPERSCALAR DATA PROCESSING SYSTEM

[75] Inventors: Kin Shing Chan, Austin, Tex.; Ravindra Kumar Nair, Briarcliff Manor, N.Y.

[73] Assignee: International Business Machines Corporation, Armonk, N.Y.

[21] Appl. No.: 531,882

[22] Filed: Sep. 20, 1995

[51] Int. Cl.$^6$ ........................................... G06F 9/30
[52] U.S. Cl. .................. 395/800.23; 395/393; 395/389
[58] Field of Search ........................... 395/393, 392, 395/800, 389

[56] References Cited

U.S. PATENT DOCUMENTS

| | | | |
|---|---|---|---|
| 4,437,149 | 3/1984 | Pomerene et al. | 364/200 |
| 4,722,050 | 1/1988 | Lee et al. | 395/375 |
| 5,101,341 | 3/1992 | Circello et al. | 395/375 |
| 5,131,086 | 7/1992 | Circello et al. | 395/375 |
| 5,136,697 | 8/1992 | Johnson | 395/375 |
| 5,214,763 | 5/1993 | Blaner et al. | 395/375 |
| 5,337,415 | 8/1994 | Delano et al. | 395/375 |
| 5,560,028 | 9/1996 | Sachs | 395/800 |

OTHER PUBLICATIONS

IBM Technical Disclosure Bulletin, vol. 14, No. 12, May 1972, pp. 3599–3611, "*Instruction Sequencing Control*".

IBM Technical Disclosure Bulletin, vol. 25, No. 1, Jun. 1982, pp. 134–135, "*Improved Condition Code and Branch Handling for Model 91–Like Implementation of the IBM System/370 Architecture*".

IBM Technical Disclosure Bulletin, vol. 25, No. 1, Jun. 1982, pp. 136–137, "*New Condition Code and Branch Architecture for High Performance Procesors*".

Barreh et al.; "The Power2 Processor" Mar/1994; IEEE.

Minagawa et al. "Pre Decoding Mechanism for Superscalar Architecture" IEEE; 1991.

*Primary Examiner*—Larry D. Donaghue
*Attorney, Agent, or Firm*—Mark E. McBurney; Andrew J. Dillon

[57] ABSTRACT

In response to reloading an instruction from main memory for storing in an instruction cache in a superscalar data processing system, a particular instruction category in which the instruction belongs is selected from multiple instruction categories. Types of data processing system resources required for instruction execution and a quantity of each type of resource required are determined. Thereafter, a plurality of decode bits are calculated, wherein the decode bits represent a particular instruction category in which the instruction belongs and the type and quantity of each data processing system resource required for execution of the instruction. Thereafter, the instruction and the predecode bits are stored in instruction cache. The predecode bits enable the dispatch unit to efficiently, and without fully decoding the instruction at dispatch time, select an execution unit for executing the instruction and determine if the data processing system resources required for execution of the instruction are available before the dispatch unit dispatches the instruction.

18 Claims, 4 Drawing Sheets

(35) = 0

| (32:33) \ (36:37) | 00 | 01 | 11 | 10 |
|---|---|---|---|---|
| 00 | 0g 0f none | 1g 0f none | 1g 0f CR0 | — |
| 01 | 0g 0f none | 1g 0f none | — | 0g 0f CR0 |
| 11 | 0g 0f none | 1g 0f none | 1g 1f none | 0g 1f none |
| 10 | 0g 0f none | — | 0g 1f CR1 | 0g 1f none |

(35) = 1

| (32:33) \ (36:37) | 00 | 01 | 11 | 10 |
|---|---|---|---|---|
| 00 | — | — | — | 0g 0f BF |
| 01 | — | — | 2g 0f none | — |
| 11 | — | — | — | — |
| 10 | — | — | 0g 0f CR1 | 0g 0f BF |

*Fig. 3*

Simple Decode Scheme

LD/ST = insn(33)

FX RR = ^insn(32) & ^insn(33) & ^insn(34)

FX LS = insn(33) & ^insn(34)

FP RR = insn(32) & ^insn(33) & insn(34)

FP LS = insn(33) & insn(34)

Branch = insn(38)

LCR = insn(32) & ^insn(34)

0 gpr : OS1 = ( insn(32) & ^insn(33) ) | ^insn(37)

1 gpr : OS1= ( ^insn(32) & ^insn(35) & insn(37) )
       | ( insn(33) & ^insn(35) & insn(37) )

2 gpr : OS1 = insn(33) & insn(35)

0 fpr : OS2 = ^insn(32) | insn(35) | ^insn(36)

1 fpr : OS2 = insn(32) & ^insn(35) & insn(36)

CR0 : OSE3 = ^insn(32) & ^insn(35) & insn(36)

CR1 : OSE3 = insn(32) & ^insn(33) & insn(37)

BF : OSE3 = insn(35) & ^insn(37)

*Fig. 4*

METHODS AND SYSTEM FOR PREDECODING INSTRUCTIONS IN A SUPERSCALAR DATA PROCESSING SYSTEM

BACKGROUND OF THE INVENTION

1. Technical Field

The present invention relates in general to an improved data processing system, and in particular to a method and system for predecoding instructions in a superscalar data processing system. More particularly, the present invention relates to a method and system for predecoding instructions that provides additional information needed to dispatch instructions and enable early resolution of branch instructions.

2. Description of the Related Art

A superscalar data processing system is a data processing system that can issue multiple instructions concurrently from a conventional linear instruction stream. In a superscalar data processing system, multiple instructions can be in the same stage at the same time. A stage is an element in the pipeline at which certain actions are performed, such as decoding the instruction, performing an arithmetic operation, and writing back the results. A stage typically takes a cycle to perform its operation; however, some stages are repeated (a double-precision floating-point multiply, for example). When this occurs, an instruction immediately following it in the pipeline is forced to stall in its cycle. A stall occurs when an instruction cannot proceed to the next stage.

An example of an implementation of a superscalar data processing system is the processor sold under the trademark PowerPC by International Business Machines Corporation and Motorola Incorporated. In such a superscalar data processing system, instructions generally flow through the following stages during execution: fetch stage, decode stage, dispatch stage, execute stage, completion stage, and write-back stage. Before the fetch stage, an instruction cache is loaded with instructions from main memory using a burst-read memory operation, which may load an entire line in the instruction cache. In the fetch stage, a fetch unit typically provides instructions to an instruction queue by accessing the instruction cache to recall four or more instructions at a time. However, if a cache miss occurs, a main memory access is required.

Once instructions have been fetched from instruction cache, a decode/dispatch unit decodes the instructions during the decode stage and issues them to an appropriate execution unit during the decode stage. The decode stage takes an entire cycle to fully decode instructions in the instruction buffer. Instruction decoding is required to determine source dependency for out-of-order execution, to determine which execution element or elements are needed for instruction execution, to assign data processing system resources such as general purpose registers, to determine validity of the instruction, and to obtain required facilities and operands.

After the decode stage, the dispatch pipeline stage is responsible for non-time-critical decoding of instructions supplied by the decode stage and for determining which of the instructions can be dispatched in the current cycle. At the end of the dispatch stage, the dispatched instructions and their operands are latched into reservation stations or execution input latches at the execution unit.

After an instruction passes through the common stages of fetch, decode, and dispatch, they are passed to the appropriate execution unit where they are said to be in "execute stage." The time that an instruction spends in execute stage varies depending on the execution unit. The execute stage executes the instruction selected in the dispatch stage, which may come from the reservation stations associated with an execution unit or from instructions arriving from dispatch. At the end of the execution stage, the execution unit writes the results into the appropriate rename buffer entry, and notifies the complete stage that the instruction has finished execution.

The completion stage maintains the correct architectural machine state. When an instruction finishes execution, its status is recorded in its completion buffer entry. The completion buffer is managed as a first-in-first-out (FIFO) buffer; it examines the entries in the order in which the instruction were dispatched. The fact that the completion buffer allows the processor to retain the program order insures that instructions are completed in order.

As discussed above, the decode stage of instruction execution is one of the stages that adds to the time it takes to execute an instruction. As should be apparent to those persons skilled in the art, reducing the amount of time required to execute an instruction is one way to increase the performance of the data processing system—the sooner an instruction is fetched, decoded, dispatched, executed, completed and written-back, the sooner the next instruction can enter the pipeline. Thus, a shorter pipeline means that each instruction completes in fewer clock cycles, resulting in faster overall code execution.

In view of the above, it would be desirable to provide a method and system that provides instruction decoding and dispatching in the same stage or cycle in a superscalar data processing system. To accomplish this, is further desirable to predecode instructions before such instructions are stored in cache and include representations in predecode bits that reduces the time required to decode instructions to determine if such instructions may be dispatched considering the state of the data processing system at dispatch time.

SUMMARY OF THE INVENTION

It is therefore one object of the present invention to provide an improved data processing system.

It is another object of the present invention to provide a method and system for predecoding instructions in a superscalar data processing system.

It is yet another object of the present invention to provide a method and system for predecoding instructions wherein additional information needed to dispatch instructions and enable early resolution of branch instruction is provided in predecode data.

The foregoing objects are achieved as is now described. In response to reloading an instruction from main memory for storing in an instruction cache in a superscalar data processing system, a particular instruction category in which the instruction belongs is selected from multiple instruction categories. Types of data processing system resources required for instruction execution and a quantity of each type of resource required are determined. Thereafter, a plurality of decode bits are calculated, wherein the decode bits represent a particular instruction category in which the instruction belongs and the type and quantity of each data processing system resource required for execution of the instruction. Thereafter, the instruction and the predecode bits are stored in instruction cache. The predecode bits enable the dispatch unit to efficiently, and without fully decoding the instruction at dispatch time, select an execution unit for executing the instruction and determine if the data processing system resources required for execution of the instruction are available before the dispatch unit dispatches the instruction.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a Karnaugh map illustrating the logical function for calculating predecode bits that indicate data processing system resources needed for execution in accordance with one embodiment of the present invention; and FIG. 4 illustrates various logic expressions for interpreting predecode bits in accordance with the method and system of the present invention.

DETAILED DESCRIPTION OF THE PREFERRED EMBODIMENT

Figure 1:
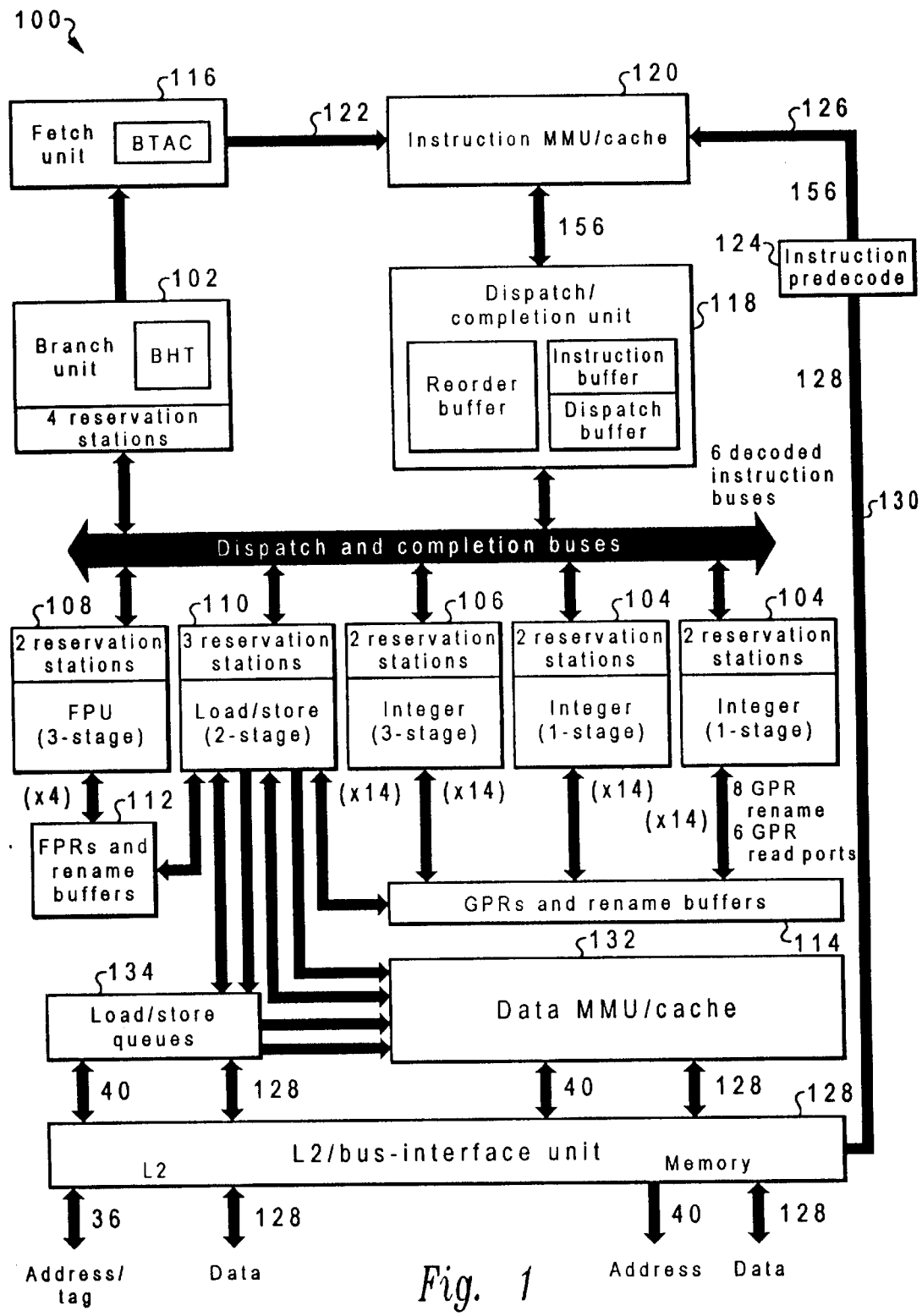
FIG. 1 depicts a superscalar data processing system having an instruction predecode function in accordance with a preferred embodiment of the present invention.

With reference now to the figures, and in particular with reference to FIG. 1, there is depicted a superscalar data processing system in accordance with the method and system of the present invention. Note that data processing system 100 is illustrated as conceptual block diagram intended to show the basic features rather than an attempt to show how these features are physically implemented on a chip.

A superscalar data processing system is one that issues multiple instructions into multiple pipelines allowing multiple instructions to execute and parallel. As illustrated in FIG. 1, superscalar data processing system 100 includes six independent execution units and two register files. The six independent execution units may include: branch processing unit (BPU) 102, two single-cycle integer units (SCIUs) 104, one multi-cycle integer unit (MCIU) 106, floating-point unit (FPU) 108, and load/store unit (LSU) 110. Register files may include: floating-point registers (FPRs) 112 and general-purpose registers (GPRs) 114. Both FPR 112 and GPR 114 may include rename buffers, which provide a way to buffer data intended for the registers, reducing stalls when the results of one instruction are required by a subsequent instruction. GPRs and their associated rename buffers serve as the data source or the destination for instructions executed in the integer units. FPRs and their associated rename buffers may contain data objects of either single-precision or double-precision floating-point formats. FPRs and their associated rename buffers also serve as the data source or the destination for instructions executed in floating-point unit 108.

Fetch unit 116 provides instructions to the instruction buffer in dispatch/completion unit 118. Fetch unit 116 provides such instructions using the next sequential address or the address supplied by BPU 102 when a branch is predicted or resolved. Fetch unit 116 also provides a branch-target address cache (BTAC) in which fetch unit 116 caches the branch instructions and their target addresses.

Fetch unit 116 is coupled to instruction memory management unit/cache 120 via address bus 122. According to an important aspect of the present invention, instruction (MMU)/cache 120 receives instructions from instruction predecoder 124 via instruction bus 126. Instruction predecoder 124 receives instructions from L2/bus-interface unit 128 via instruction bus 130. As illustrated, bus 130 is 128 bits wide—enough bits to transfer four 32-bit instructions at a time. And in the embodiment illustrated in FIG. 1, instruction bus 126 is 156 bits wide—enough for four 32-bit instructions and seven additional predecode bits per instruction. Of course, instruction width, and the number of predecode bits per instruction, may vary depending upon various design choices.

Data memory management unit (MMU)/cache 132 provides memory management and cache functions for data in data processing system 100. Load/store queues 134 are utilized during the dispatch of each load/store instruction to store the effective address of the operand/target. For load instructions, load requests may be sent to the cache speculatively. For store instructions, both store address and store data are kept in the store queue before they are sent to the data memory management unit to perform the store.

Figure 2:
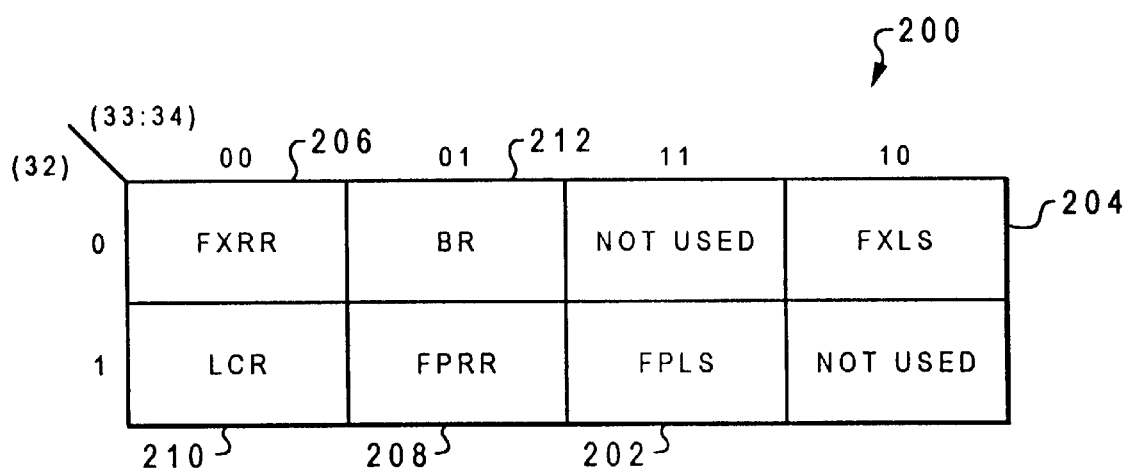
FIG. 2 is a Karnaugh map illustrating the logical function for calculating predecode bits that indicate an instruction category in accordance with one embodiment of the present invention.

With reference now to FIG. 2, there is depicted a Karnaugh map of the logical function that calculates bits 32, 33, and 34 of the predecode bits that are appended to a 32-bit instruction. According to one embodiment of the present invention, these 3 bits are used to indicate a category to which an instruction belongs so that dispatch/completion unit 118 may quickly determine whether or not an instruction may be dispatched. Instruction categories may be selected to indicate what type of execution unit will be used to execute the instruction and may also indicate what the instruction does or what other data processing resources are affected or needed by the instruction. Data processing system resources needed for execution of an instruction may include various parts of the data processing system such as, for example, output registers, source data in input registers, bus or memory availability, reservation station availability, rename buffer availability, or other such data or signal dependencies, or machine states.

Dispatch/completion unit 118 determines whether or not an instruction may be dispatched based on the availability of completion buffers, reservation stations in the appropriate execution unit, fixed-point unit rename buffers (if needed), floating-point unit rename buffers (if needed), condition register rename buffers (if needed), and the limit on the maximum number of instructions that may be dispatched per cycle. Additionally, certain instructions are context synchronizing instructions. Instructions prior to such context synchronizing instructions must be completed before the context synchronizing instruction can be dispatched and executed. And, instructions following the context synchronizing instructions cannot be dispatched until the context synchronizing instruction has completed. Therefore, to inform dispatch/completion unit 118 that a particular type of execution unit is needed and particular other resources are need to execute a particular instruction, without encoding the predecode bits in a manner that requires a large amount of time to decode such bits at dispatch time, selected predecode bits have been singled out for quick decoding at dispatch time to indicate certain critical characteristics related to each instruction. This illustrates the balance between some predecode bits that require little decoding and other predecode bits, or a group of predecode bits, that are more intricately encoded to represent more information.

The ability to dispatch instructions at a peak rate is effected by availability of data processing system resources such as execution units, destination rename registers, and completion buffer entries. To avoid dispatch unit stalls due to instruction data dependencies, each execution may have one or more reservation stations. If a data dependency could prevent an instruction from beginning execution, that instruction is dispatched to the reservation station associated with its execution unit, clearing the dispatch unit. If the second instruction in the dispatch unit requires the same execution unit, that instruction is not dispatched until the reservation station at that same execution unit can receive another instruction. For an instruction to be issued, the required reservation station must be available at the execution unit. The dispatcher monitors the availability of all execution units and suspends instruction dispatch if the required reservation station is not available.

In the present invention, the instruction set of data processing system 100 has been classified into multiple instruction categories. In a preferred embodiment, six instruction categories are utilized: a fixed-point register-to-register instruction category (FXRR), a fixed-point load/store instruction category (FXLS) a floating-point register-to-register instruction category (FPRR), a floating-point load/store instruction category (FPLS), a branch unit logical condition register (LCR) instruction category, and a branch (BR) instruction category.

Fixed-point register-to-register are executed in the fixed-point unit and instructions include instructions that utilize operands from the fixed-point unit architected facilities, the fixed-point rename buffers, or immediate data. Results from executing fixed-point register-to-register instructions will be written back to the fixed-point architected facilities in the fixed-point unit at completion time. Most of the fixed-point register-to-register instructions need one fixed-point rename buffer.

Fixed-point load/store instructions are executed in the fixed-point unit and include instructions that utilize operands available from the fixed-point unit architected facilities, fixed-point unit rename buffers, or immediate data. An effective address (EA) will be calculated from the source operands. The effective address may be converted to a real address (RA) through address translation, and the real address is then used to access memory storage in the data cache or high memory hierarchy. Results of the memory access will be written into the target fixed-point unit facilities. Such fixed-point load/store instructions can modify either one or two fixed-point unit facilities.

Floating-point register-to-register instructions are executed in the floating-point unit and include instructions that utilize operands from the floating-point unit architected facilities, the floating-point rename buffers, or immediate data. Results of the floating-point register-to-register instructions will be written back to the floating-point unit architected facilities in the floating-point unit at completion time. Most of the floating-point register-to-register instructions modify one floating-point unit rename buffer.

Floating-point load/store instructions are executed in the floating-point unit and include instructions that are similar to the fixed-point load/store type of instruction. The floating-point load/store instructions utilize operands from the floating-point unit architected facilities, floating-point unit rename buffers, or immediate data. An effective address (EA) is calculated from the source operands. The effective address may be converted to a real address (RA) through address translation, and the RA is used to access the memory storage in the data cache or high memory hierarchy. The result of the memory access is written back to the target floating-point unit facilities. Floating-point load/store instructions can modify one floating-point unit facility.

Branch unit logical condition register instruction category includes instructions that are dispatched to, and executed in, the branch unit. Operands of logical condition register instructions may be available from the architected condition register (CR) or from the condition register rename buffer. The result of execution is written back to the architected condition register at completion time. Most logical condition register instructions require one condition register rename buffer.

Branch instruction category includes instructions that are dispatched to, and executed in, the branch unit. Branch instructions that are "taken" at execution cause execution to continue at the "target address" generated by the branch instruction. The operand for the branch instruction may be available from immediate data, an architected link register, or an architected count register. Other forms of branch related instructions are "trap" and "system call" instructions, and the "return from interrupt" instruction.

In the embodiment illustrated, selected predecode bits have been selected to quickly decode to indicate critical characteristics related to the associated instruction. For example, bit 33 is set if a load/store instruction is predecoded, as indicated by the floating-point load store notation at reference numeral 202 and the fixed point load/store notation at reference numeral 204. Similarly, bit 33 is a zero if a register-to-register instruction is predecoded, as depicted by the fixed-point register-to-register instruction at reference numeral 206 and the floating-point register-to-register notation at reference numeral 208.

If a floating-point instruction is predecoded, bit 32 is set to a one, as illustrated by floating-point register-to-register notation at reference numeral 208 and floating-point load/store instruction notation at reference numeral 202. Similarly, bit 32 is set to zero if a fixed-point instruction is predecoded, as depicted by fixed-point register-to-register instruction notation at reference numeral 206, and fixed-point load/store instruction notation at reference numeral 204.

According to the present invention bit 38 is reserved for indicating branch instructions. If a branch instruction is predecoded, bit 38 is set to one, and if a nonbranch instruction is decoded, bit 38 is equal to zero.

Logical condition register instructions are predecoded to produce a 100b for bits 32–34, as depicted at reference 210. A branch instruction produces predecode code bits of 001b for bits 32–34, as depicted at reference 212.

With reference now to FIG. 3, there is depicted a Karnaugh map illustrating the logical function of calculating predecode code bits to indicate types and quantities of data processing system resources required for executing the predecoded instruction. The Karnaugh map entries are translated in Table 1 below.

TABLE 1

| | |
|---|---|
| 0g | Instruction renames zero GPRs |
| 1g | Instruction renames one GPR |

TABLE 1-continued

| | |
|---|---|
| 2g | Instruction renames two GPRs |
| 0f | Instruction renames zero FPRs |
| 1f | Instruction renames one FPR |
| CR0 | Instruction modifies CR0 implicitly |
| CR1 | Instruction modifies CR1 implicitly |
| BF | Instruction modifies any one of the CR fields |
| none | Instruction modifies zero CR fields. |

Thus, using the Karnaugh map in FIG. 3 and table 1, if an instruction uses one general purpose register, one float-point register, and does not modify a CR field, the predecode bits would be set as follows: bit 35=0, bit 32=1, bit 33=1, bit 36=1, and bit 37=1.

With reference now to FIG. 4, there is depicted logical equations for interpreting the predecode bits to determine what category a particular instruction belongs to, and to determine the type and quantity of data processing system resources required to execute the instruction associated with the predecode bits. Note from these logical equations that both the instruction category and the type and quantity of data processing system resource may be determined in two gate delays utilizing three-input AND and three-input OR gates to implement these equations.

In summary, the invention described above performs a predecoding function that produces predecode bits that are appended to instructions as such instructions are loaded into instruction cache. The predecode bits according to the present invention represent a particular instruction category in which the instruction belongs and a type and quantity of data processing system resources required for execution of the predecode instruction. By providing information about the instruction category and the data processing system resources required for execution, the time required to decode instructions at dispatch time is reduced so that an instruction decoding stage and an instruction dispatching stage may be performed in the same cycle in the superscalar data processing system. Merging the decode stage with the dispatch stage may reduce instruction latency, and thus increases the throughput of the data processing system.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a superscalar data processing system for predecoding instructions, wherein said superscalar data processing system includes an instruction cache and a dispatch unit for dispatching instructions to one of a plurality of execution units, said method comprising the steps of:

in response to reloading an instruction from main memory for storing in said instruction cache, selecting from multiple instruction categories a particular instruction category in which said instruction belongs;

determining types of superscalar data processing system resources required for execution of said instruction, and determining quantity of each of said types of superscalar data processing system resources required;

calculating a plurality of predecode bits that represent:

a particular instruction category in which said instruction belongs; and said type and said quantity of each of said superscalar data processing system resource required for execution of said instruction; and storing said instruction and said predecode bits in said instruction cache; and delaying dispatch of said instruction until an execution unit is available to accept said instruction belonging to said selected instruction category, and until said type and quantity of superscalar data processing system resources will be available when said instruction is ready to execute at an instruction unit that receives said instruction.

2. The method in a superscalar data processing system for predecoding instructions according to claim 1 wherein said step of selecting from multiple instruction categories a particular instruction category in which said instruction belongs includes selecting said particular instruction category in which said instruction belongs from a list of instruction categories including a fixed-point register-to-register instruction category, a fixed-point load/store instruction category, a floating-point register-to-register instruction category, a floating-point load/store instruction category, a branch unit logical condition register instruction category, and a branch instruction category.

3. The method in a superscalar data processing system for predecoding instructions according to claim 1 wherein said step of calculating a plurality of predecode bits that represent a particular instruction category in which said instruction belongs includes setting one of said plurality of predecode bits to represent that said instruction belongs to a branch instruction category.

4. The method in a superscalar data processing system for predecoding instructions according to claim 1 wherein said step of calculating a plurality of predecode bits that represent a particular instruction category in which said instruction belongs includes setting one of said plurality of predecode bits to represent that said instruction belongs to an instruction category that includes instructions that perform floating-point operations or that said instruction belongs to an instruction category that includes instructions that perform fixed-point operations.

5. The method in a superscalar data processing system for predecoding instructions according to claim 1 wherein said step of calculating a plurality of predecode bits that represent a particular instruction category in which said instruction belongs includes setting one of said plurality of predecode bits to represent that said instruction belongs to an instruction category that includes instructions that perform load/store operations.

6. The method in a superscalar data processing system for predecoding instructions according to claim 1 wherein said step of calculating a plurality of predecode bits that represent said type and said quantity of each of said superscalar data processing system resource required for execution of said instruction includes setting one or more of said plurality of predecode bits to represent that said instruction requires N number of floating-point rename registers for execution, wherein N is greater than or equal to zero.

7. The method in a superscalar data processing system for predecoding instructions according to claim 1 wherein said step of calculating a plurality of predecode bits that represent said type and said quantity of each of said superscalar data processing system resource required for execution of said instruction includes setting one or more of said plurality of predecode bits to represent that said instruction requires N number of fixed-point rename registers for execution, wherein N is greater than or equal to zero.

8. The method in a superscalar data processing system for predecoding instructions according to claim 1 wherein said step of calculating a plurality of predecode bits that represent said type and said quantity of each of said superscalar data processing system resource required for execution of said instruction includes setting one or more of said plurality of predecode bits to represent that said instruction requires a condition code rename register for execution.

9. The method in a superscalar data processing system for predecoding instructions according to claim 8 wherein said step of setting one or more of said plurality of predecode bits to represent that said instruction requires a condition code rename register for execution includes setting one or more of said plurality of predecode bits to represent that said instruction requires a particular condition code rename register for execution.

10. A superscalar data processing system for predecoding instructions, wherein said superscalar data processing system includes an instruction cache and a dispatch unit for dispatching instructions to one of a plurality of execution units, said superscalar data processing system comprising:

means for selecting from multiple instruction categories a particular instruction category in which said instruction belongs in response to reloading an instruction from main memory for storing in said instruction cache;

means for determining types of superscalar data processing system resources required for execution of said instruction, and determining quantity of each of said types of superscalar data processing system resources required;

means for calculating a plurality of predecode bits that represent:
 a particular instruction category in which said instruction belongs; and
 said type and said quantity of each of said superscalar data processing system resource required for execution of said instruction; and means for storing said instruction and said predecode bits in said instruction cache; and means for delaying dispatch of said instruction unit until an execution unit is available to accept said instruction belonging to said selected instruction category, and until said type and quantity of superscalar data processing system resources will be available when said instruction is ready to execute at an execution unit that receives said instruction.

11. The superscalar data processing system for predecoding instructions according to claim 10 wherein said means for selecting from multiple instruction categories a particular instruction category in which said instruction belongs includes means for selecting said particular instruction category in which said instruction belongs from a list of instruction categories including a fixed-point register-to-register instruction category, a fixed-point load/store instruction category, a floating-point register-to-register instruction category, a floating-point load/store instruction category, a branch unit logical condition register instruction category, and a branch instruction category.

12. The superscalar data processing system for predecoding instructions according to claim 10 wherein said means for calculating a plurality of predecode bits that represent a particular instruction category in which said instruction belongs includes means for setting one of said plurality of predecode bits to represent that said instruction belongs to a branch instruction category.

13. The superscalar data processing system for predecoding instructions according to claim 10 wherein said means for calculating a plurality of predecode bits that represent a particular instruction category in which said instruction belongs includes means for setting one of said plurality of predecode bits to represent that said instruction belongs to an instruction category that includes instructions that perform floating-point operations or that said instruction belongs to an instruction category that includes instructions that perform fixed-point operations.

14. The superscalar data processing system for predecoding instructions according to claim 10 wherein said means for calculating a plurality of predecode bits that represent a particular instruction category in which said instruction belongs includes means for setting one of said plurality of predecode bits to represent that said instruction belongs to an instruction category that includes instructions that perform load/store operations.

15. The superscalar data processing system for predecoding instructions according to claim 10 wherein said means for calculating a plurality of predecode bits that represent said type and said quantity of each of said superscalar data processing system resource required for execution of said instruction includes means for setting one or more of said plurality of predecode bits to represent that said instruction requires N number of floating-point rename registers for execution, wherein N is greater than or equal to zero.

16. The superscalar data processing system for predecoding instructions according to claim 10 wherein said means for calculating a plurality of predecode bits that represent said type and said quantity of each of said superscalar data processing system resource required for execution of said instruction includes means for setting one or more of said plurality of predecode bits to represent that said instruction requires N number of fixed-point rename registers for execution, wherein N is greater than or equal to zero.

17. The superscalar data processing system for predecoding instructions according to claim 10 wherein said means for calculating a plurality of predecode bits that represent said type and said quantity of each of said superscalar data processing system resource required for execution of said instruction includes means for setting one or more of said plurality of predecode bits to represent that said instruction requires a condition code rename register for execution.

18. The superscalar data processing system for predecoding instructions according to claim 17 wherein said means for setting one or more of said plurality of predecode bits to represent that said instruction requires a condition code rename register for execution includes means for setting one or more of said plurality of predecode bits to represent that said instruction requires a particular condition code rename register for execution.

* * * * *